United States Patent [19]

Nishio et al.

[11] Patent Number: 5,006,745
[45] Date of Patent: Apr. 9, 1991

[54] POLYPHASE DIRECT CURRENT MOTOR

[75] Inventors: Akira Nishio; Masato Nakamura, both of Fujieda; Akihiro Mochizuki, Shizuoka, all of Japan

[73] Assignee: Victor company of Japan, Ltd., Yokohama, Japan

[21] Appl. No.: 388,888

[22] Filed: Aug. 3, 1989

[30] Foreign Application Priority Data

Aug. 3, 1988 [JP] Japan .................. 63-194122
Aug. 3, 1988 [JP] Japan .................. 63-194123

[51] Int. Cl.$^5$ .................................. H02K 17/12
[52] U.S. Cl. .................. 310/177; 310/67 R; 310/154; 310/156; 310/179; 310/184; 310/195; 310/198
[58] Field of Search .............. 310/46, 177, 152, 154, 310/156, 195, 203, 204, 207, 179, 180, 181, 184, 186, 185, 198, 67 R, 208, 269, 51

[56] References Cited

U.S. PATENT DOCUMENTS

| 3,794,870 | 2/1974 | Broadway | 310/180 |
| 3,909,646 | 9/1975 | Peterson | 310/156 |
| 4,013,909 | 3/1977 | Broadway | 310/180 |
| 4,338,534 | 7/1982 | Broadway | 310/198 |
| 4,672,251 | 6/1987 | Broadway | 310/184 |
| 4,692,645 | 9/1987 | Gotou | 310/184 |
| 4,774,428 | 9/1988 | Konecny | |

FOREIGN PATENT DOCUMENTS

| 61-14743 | 4/1986 | Japan . |
| 62-123944 | 6/1987 | Japan . |
| 63-294243 | 11/1988 | Japan . |
| 63-316648 | 12/1988 | Japan . |
| 64-19949 | 1/1989 | Japan . |

*Primary Examiner*—R. Skudy
*Attorney, Agent, or Firm*—Pollock, VandeSande & Priddy

[57] ABSTRACT

A three-phase direct-current motor has a field magnet having P field poles positioned as a circular array at angularly equally spaced intervals, and an armature having cores providing N slots with three-phase coils disposed therein, either the field magnet or the armature being rotatable with respect to the other. P and N are defined by $P=2(4n+3)$ and $N=3(2n+1)$ where n is an integer of 1 or more, and being selected such that the least common multiple of N and P is equal to $N \times P$. Alternatively, P and N are defined by $P=2(3n\pm1)$ and $N=6n$ where n is an integer of 2 or more.

5 Claims, 11 Drawing Sheets

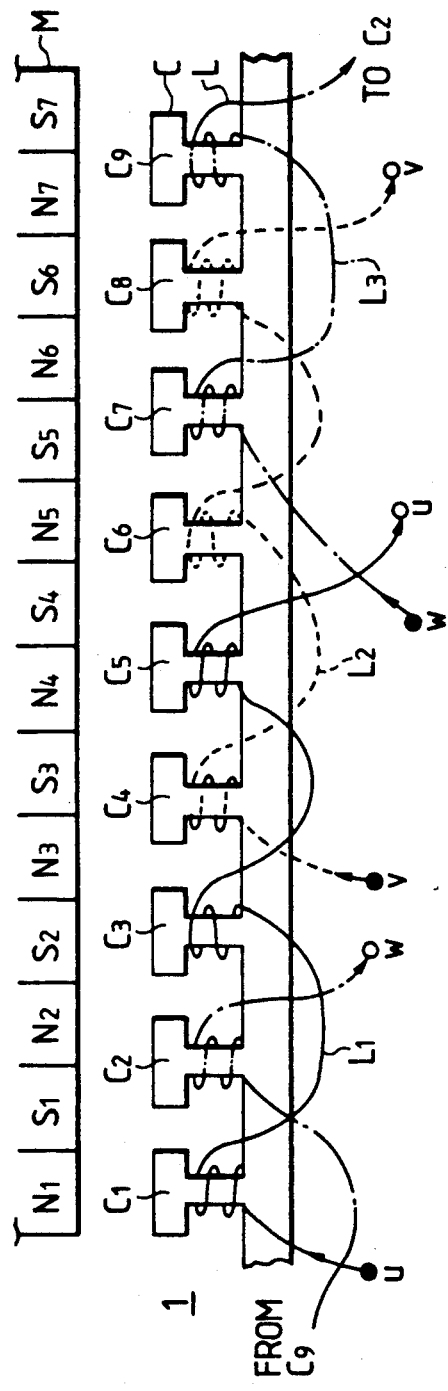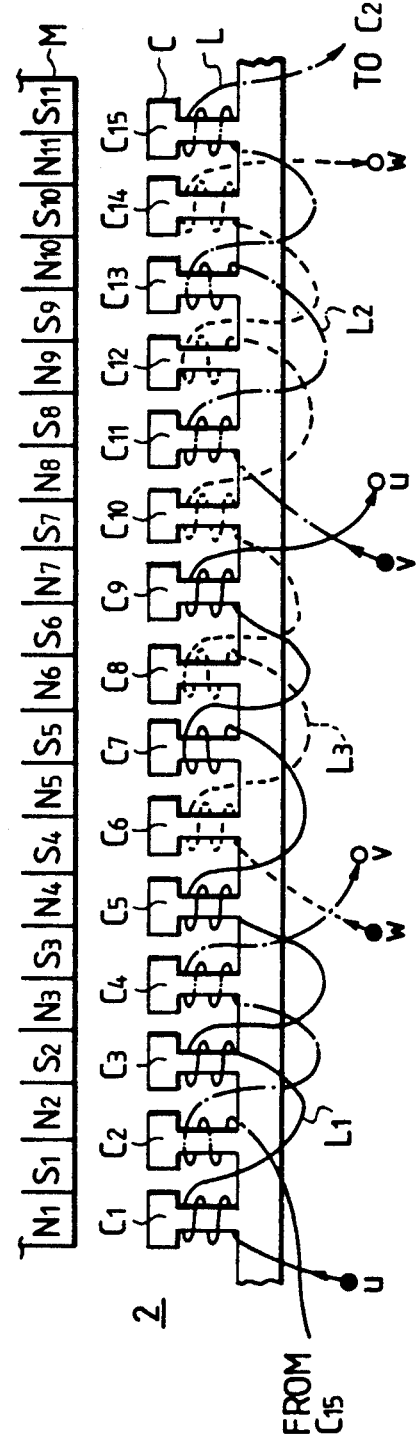
FIG. 1
FIG. 2

FIG. 13
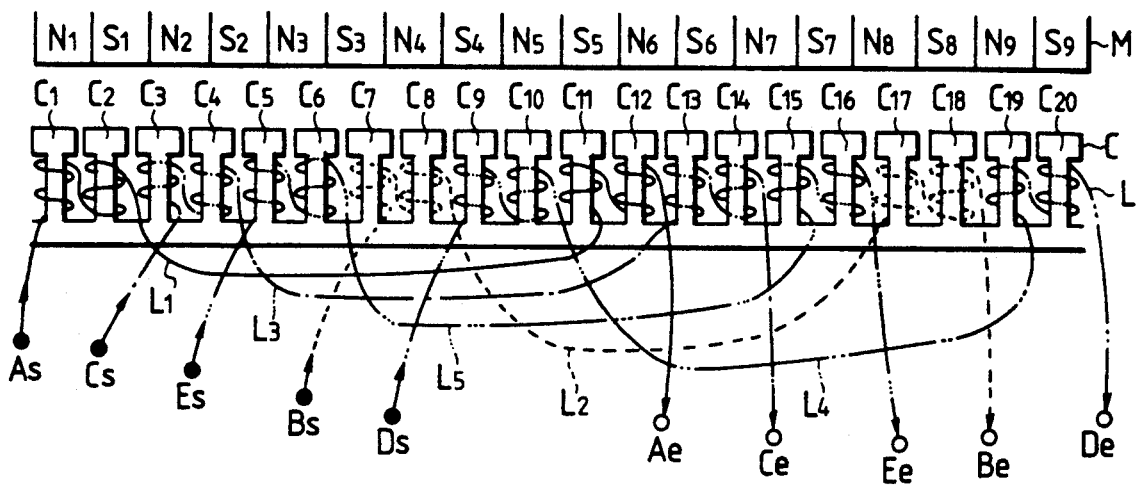
FIG. 14A
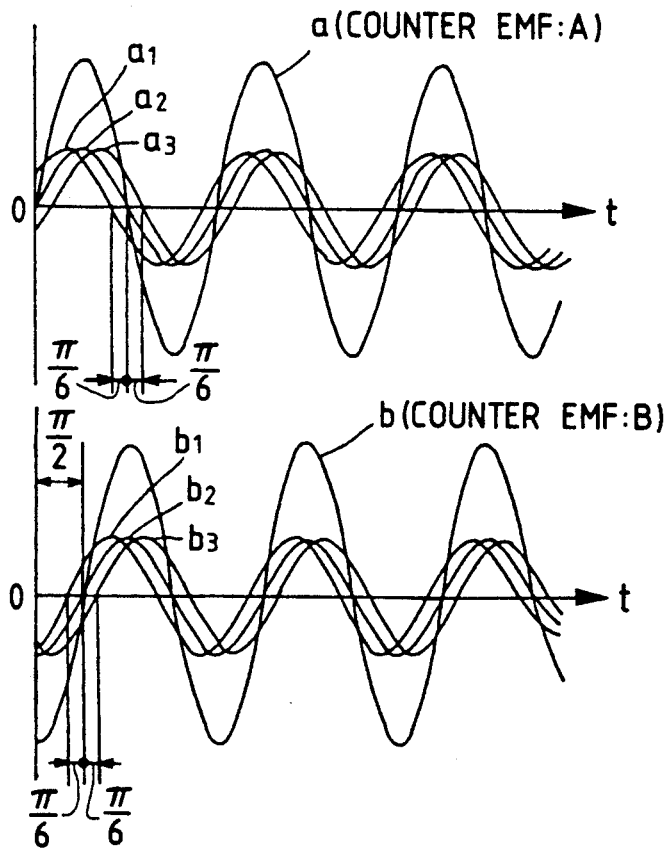
FIG. 14B

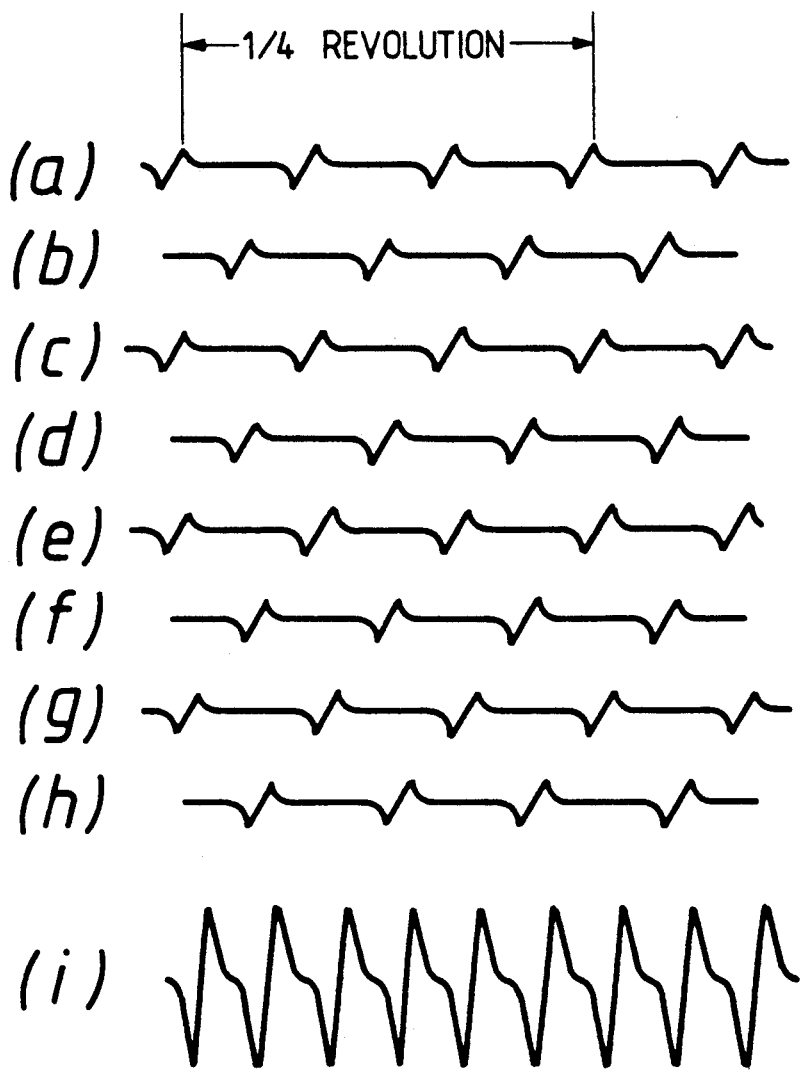

POLYPHASE DIRECT CURRENT MOTOR

BACKGROUND OF THE INVENTION

1. Field of the Invention

The present invention relates to a polyphase direct-current motor, and more particularly to a three-phase direct-current core-type motor which minimizes cogging and hence reduces vibration and noise during operation.

2. Prior Art

Recently, polyphase direct-current motors such as three-phase direct-current motors having armature cores are widely used in various applications such as drum motors and capstan motors in video tape recorders (VTR), for example.

As the slots in the core of a polyphase direct-current motor move past the boundaries between field poles (i.e., N and S poles), the motor suffers torque and speed variations known as cogging. The mechanism which generates cogging will be described below with respect to a three-phase direct-current motor.

Generally, the number P of field poles and the number N of slots (protruding poles) in a three-phase direct-current motor are given by:

$$P = (3 \pm 1)n, \quad N = 3n$$

where n is an integer of 1 or more. Tables 1 and 2 below show the frequencies of cogging per revolution of the rotor of a three-phase direct-current motor. Tables 1 and 2 indicate that the cogging frequency F is represented by the least common multiple of P and N, and the number of positions K where cogging takes place at the same time is represented by the greatest common measure of P and N.

TABLE 1

| [P = (3 + 1)n] | | | | |
|---|---|---|---|---|
| n | P | N | F | K |
| 1 | 4 | 3 | 12 | 1 |
| 2 | 8 | 6 | 24 | 2 |
| 3 | 12 | 9 | 36 | 3 |
| 4 | 16 | 12 | 48 | 4 |
| 5 | 20 | 15 | 60 | 5 |
| 6 | 24 | 18 | 72 | 6 |
| 7 | 28 | 21 | 84 | 7 |
| 8 | 32 | 24 | 96 | 8 |
| . | . | . | . | . |
| . | . | . | . | . |
| . | . | . | . | . |

TABLE 2

| [P = (3 − 1)n] | | | | |
|---|---|---|---|---|
| n | P | N | F | K |
| 1 | 2 | 3 | 6 | 1 |
| 2 | 4 | 6 | 12 | 2 |
| 3 | 6 | 9 | 18 | 3 |
| 4 | 8 | 12 | 24 | 4 |
| 5 | 10 | 15 | 30 | 5 |
| 6 | 12 | 18 | 36 | 6 |
| 7 | 14 | 21 | 42 | 7 |
| 8 | 16 | 24 | 48 | 8 |
| . | . | . | . | . |
| . | . | . | . | . |

The manner in which cogging is generated in a three-phase direct-current motor will be described with reference to FIGS. 15 through 17 of the accompanying drawings, where n = 4 (i.e. 8 field poles and 12 armature slots).

As shown in FIG. 15, a three-phase direct-current motor 100 comprises an armature having a core 100C with coils 100L wound in 12 slots between protruding or salient poles $c_1$ through $c_{12}$, and a cylindrical field magnet having 8 radially magnetized field magnetic poles 100M, the field magnet being radially spaced with an air gap G from the core 100C. A cylindrical yoke Y of iron for providing a magnetic path is fitted over the cylindrical field magnet. In operation, either the field magnet or the armature is fixed, whereas the other is rotated.

When the motor is energized, cogging is produced as the slots move successively past the boundaries a through h between the N and S poles 100M of the field magnet, resulting in torque or speed variations as shown in FIG. 17 at (a) through (h) at the respective magnetic pole boundaries (a) through (h). The total cogging of the motor 100 has a waveform as shown in FIG. 17 at (i), and occurs at 24 cycles per revolution, which cycles are equivalent to the least common multiple of P (= 8: the number of field poles) and N (= 12: the number of slots).

As described above, the number of positions K where cogging takes place at the same time is indicated by the greatest common measure of P and N, and hence is 4. The number K can also be expressed by:

$$K = N \times P / \text{the least common multiple of N and P} \quad (1)$$

If it is assumed that the magnitude of cogging which takes place at each of the pole boundaries a through h is represented by t, then the magnitude T of the entire cogging of the motor 100 at any one time is indicated by:

$$T = Kt = 12 = 8t/24 = 4t$$

Therefore, the magnitude of the total cogging of the motor 100 is four times the magnitude of the cogging at each of the pole boundaries a through h.

As shown in FIG. 16, the protruding poles $c_1$, $c_4$, $c_7$, $c_{10}$ are in phase with the field magnetic poles 100M. Therefore, if the coil 100L is wound clockwise (CW) around the protruding pole $c_1$, then it is also wound CW around each of the protruding poles $c_4$, $c_7$, $c_{10}$, these coils constituting U-phase coils. Similarly, V- and W-phase coils are provided by the coils wound around the protruding poles $c_2$, $c_5$, $c_8$, $c_{11}$ and the protruding poles $c_3$, $c_6$, $c_9$, $c_{12}$, respectively. In FIG. 16, the suffix s of each phase indicates the winding start, whereas the suffix e indicates the winding end.

The phase difference $\phi$ between two adjacent protruding poles with respect to the field magnetic poles 100M is expressed by an electrical angle which is given as follows:

$$\phi = (360°/N) \times (P/2) \quad (2)$$

For example, the phase difference between two adjacent protruding poles with the U- and V-phase coils wound respectively therearound, e.g., the protruding poles $c_1$ and $c_2$, is an electrical angle of 120° because $\phi = (160°/12) \times 8/2 = 120°$. Likewise, the phase difference between two adjacent protruding poles with the V- and W-phase coils wound respectively therearound, and the phase difference between two adjacent protruding poles with the W-and U-phase coils wound respectively therearound are each an electrical angle of 120°.

When currents of three phases, i.e., U, V, and W phases, which are out of phase with each other by an electrical angle of 120° are supplied to the U-, V-, and W-phase coils, a continuous torque is developed between the armature and the field magnet, thus rotating the three-phase direct-current motor 100. Since the four protruding poles in each set are held in phase with the magnetic poles 100M, the magnitude of the total cogging of the motor 100 at any one time is about four times the magnitude of the cogging produced at each slot, as described above.

Therefore, the magnitude of the total cogging of the motor 100 at any one time is equal to the product of the magnitude of the cogging produced at each slot and the number of places where cogging is developed at the same time. Since the number of such places in the conventional motor is large, the produced total cogging is also large.

As described above in Tables 1 and 2, as the number n increases, the number of positions where simultaneous cogging takes place also increases. Therefore, if the number of poles P and the number of slots (protruding poles) N are increased in order to reduce torque ripples, then the magnitude of cogging is also increased.

In cases where the motor 100 is employed as a drum motor or a capstan motor in a VTR, jitter or wow and flutter are increased in signals produced by the VTR, or noise and vibration are generated.

Cogging may be reduced by varying the waveform of a current used to magnetize the field magnet or defining auxiliary slots in or poles on the core 100C. However, it is difficult to establish conditions for varying the waveform of a magnetizing current. If auxiliary slots are defined in the core, then the torque generated by the motor will be reduced since the total amount of magnetic fluxes is reduced Auxiliary poles are also disadvantageous, particularly with respect to smaller motors, in that the auxiliary poles reduce the space available for the winding of coils, resulting in a reduction in the torque generated.

SUMMARY OF THE INVENTION

In view of the aforesaid problems of the conventional polyphase direct-current motor, it is an object of the present invention to provide a three-phase direct-current motor which is subjected to less cogging, and which keeps cogging at a low level, does not allow the output torque and efficiency to drop, and does not increase its cost even if the number of field magnetic poles and the number of core slots are increased.

According to the present invention, there is provided a three-phase direct-current motor comprising a field magnet having P field poles positioned as a circular array at angularly equally spaced intervals, and an armature having cores as angularly equally spaced protruding poles providing N slots with three-phase coils disposed therein, either the field magnet or the armature being rotatable with respect to the other, P and N being defined by $P=2(4n+3)$ and $N=3(2n+1)$ where n is an integer of 1 or more, and being selected such that the least common multiple of N and P is equal to $N \times P$. The coils disposed in the N slots are wound around every other core, totaling N/3 cores, in successively opposite directions, thus providing each of three phases.

According to the present invention, there is also provided a three-phase direct-current motor comprising a field magnet having P field poles positioned as a circular array at angularly equally spaced intervals, and an armature having cores providing N slots with three-phase coils disposed therein, either the field magnet or the armature being rotatable with respect to the other, P and N being defined by $P=2(3n\pm1)$ and $N=6n$ where n is an integer of 2 or more.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic developed plan view of a three-phase direct-current motor according to a first embodiment of the present invention;

FIG. 2 is a schematic developed plan view of a three-phase direct-current motor according to a second embodiment of the present invention;

FIG. 13 is a schematic developed plan view of a three-phase direct-current motor according to a ninth embodiment of the present invention;

FIGS. 14A and 14B are diagrams showing the waveforms of counterelectromotive forces generated in the three-phase direct-current motor according to the seventh embodiment;

FIG. 17 is a diagram showing cogging waveforms of the motor illustrated in FIGS. 15 and 16.

DETAILED DESCRIPTION

Figure 3A:
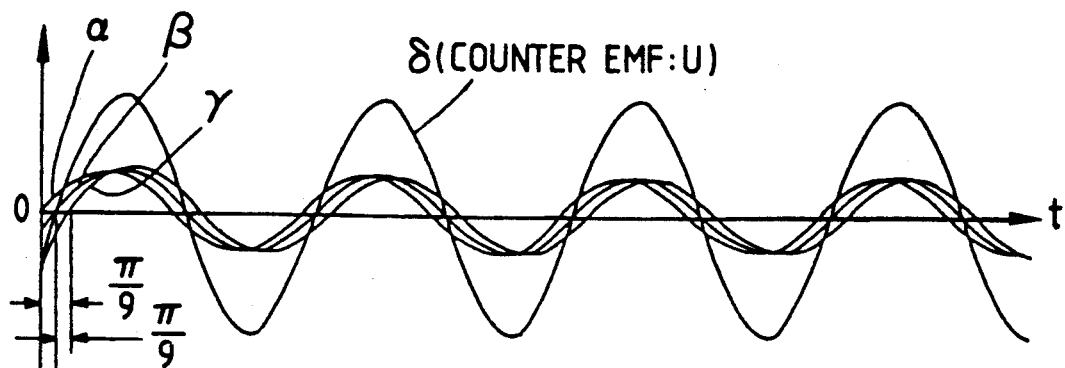
FIGS. 3A through 3C are diagrams showing the waveforms of counterelectromotive forces generated in the three-phase direct-current motor according to the first embodiment.

Like or corresponding parts are denoted by like or corresponding reference characters throughout the views.

According to the present invention, a three-phase direct-current motor comprises a field magnet having P field poles positioned as a circular array at angularly equally spaced intervals, and an armature having cores providing N slots with three-phase coils or windings disposed therein. Either the field magnet or the armature is fixed, whereas the other is rotated.

According to first and second embodiments of the present invention, the number of magnetic poles P and the number of slots N of a three-phase direct-current motor are defined as follows:

$$P=2(4n+3), N=3(2n+1)$$

where n is an integer of 1 or more except for multiples of 3.

Specific numerical values of the number of magnetic poles P, the number of slots N, and the cogging frequency F of the three-phase direct-current motor according to each of the first and second embodiments of the present invention are given in Table 3 below.

TABLE 3

| n | P | N | F |
|---|----|----|------|
| 1 | 14 | 9  | 126  |
| 2 | 22 | 15 | 330  |
| 4 | 38 | 27 | 1026 |
| 5 | 46 | 33 | 1518 |
| 7 | 62 | 45 | 2790 |
| 8 | 70 | 51 | 3570 |
| 10| 86 | 63 | 5418 |
| . | .  | .  | .    |
| . | .  | .  |      |
| . | .  | .  |      |

With P and N thus combined, the magnetic poles and the cores are all positionally displaced from each other out of alignment, and hence no cogging is produced simultaneously at different positions. Generally, the greater the cogging frequency, the smaller the magnitude of cogging. Table 3 indicates that the cogging frequency F is much higher than the cogging frequencies F of the conventional motor as indicated in Tables 1 and 2 above. Accordingly, three-phase direct-current motors according to the first and second embodiments are subjected to much less cogging and allow smooth rotation.

According to the first and second embodiments, since the cores are all out of phase with the magnetic poles, it is necessary to wind a coil around those cores which are less out of phase with each other, thus providing one phase. To meet this requirement, a coil of one phase is wound around every other core in successively opposite directions, the number of cores around which the coil of one phase is wound being indicated by (the number of slots/the number of phases).

1st Embodiment

Figure 16:
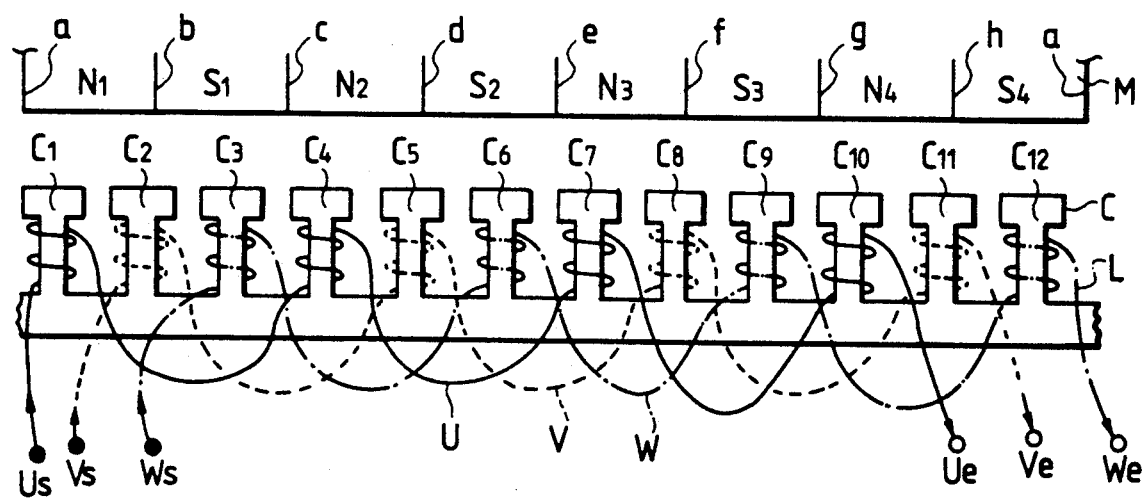
FIG. 16 is a schematic developed plan view of the three-phase direct-current motor shown in FIG. 15.

FIG. 1 shows a three-phase direct-current motor 1 according to the first embodiment of the present invention, the motor 1 having 14 magnetic poles and 9 slots (n=1 in Table 3). Those parts shown in FIG. 1 which are identical to those of the conventional motor shown in FIG. 16 are denoted by identical reference numerals, and will not be described in detail. Cores in the figures are generally indicated by c. The nine cores $c_1$ through $c_9$ are all out of phase with the magnetic poles M. Each of the three phases is provided by three cores which are positioned less out of phase with the magnetic poles M. According to the present invention, a coil of one phase is wound respectively around every other core, totaling three cores, in successively opposite directions, as described above. The coils in the figures are generally designated "L." More specifically, as shown in FIG. 1, it is assumed that a coil $L_1$ is wound clockwise (CW) around the core $c_1$. The phase difference $\Psi_2$ between the cores $c_1$, $c_3$ with respect to the magnetic poles M is given, in terms of an electrical angle, from the equation 2 as follows:

$$\Psi_2 = (360°/9) \times 2 \times 7 = 560° = 360° + 200°.$$

Therefore, the phase difference $\Psi_2$ is 200°. If the coil $L_1$ is wound counterclockwise (CCW) around the core $c_3$, then the phase difference $\Psi_2'$ on the waveform of a counterelectromotive force is given as $\Psi_2' = 200° - 180° = 20°$. If the coil $L_1$ is wound CW around the core $c_5$, then the phase difference between the cores $c_5$ and $c_3$ is 20°. A U phase is thus formed by winding the coil $L_1$ around these cores: $c_1(CW) \rightarrow c_3(CCW) \rightarrow c_5(CW)$.

The core $c_4$ is positioned out of phase with the core $c_1$ by $\psi_3 = (360°/9) \times 7 \times 4(th) = 840° = 2 \times 360° + 120°$, i.e., by 120°. A V phase is thus formed by winding a coil $L_2$ CW around the core $c_4$, CCW around the core $c_6$, and CW around the core $c_8$ {$c_4(CW) \rightarrow c_6(CCW) \rightarrow c_8(CW)$}. Likewise, a W phase is formed by winding a coil $L_3$ CW around the core $c_7$, which is 120° out of phase with the core $c_4$, CCW around the core $c_9$, and CW around the core $c_2$ {$c_7(CW) \rightarrow c_2(CCW) \rightarrow c_2(CW)$}. In this manner, the three phases U, V, W of the three-phase direct-current motor 1 are constructed.

Figure 3B:
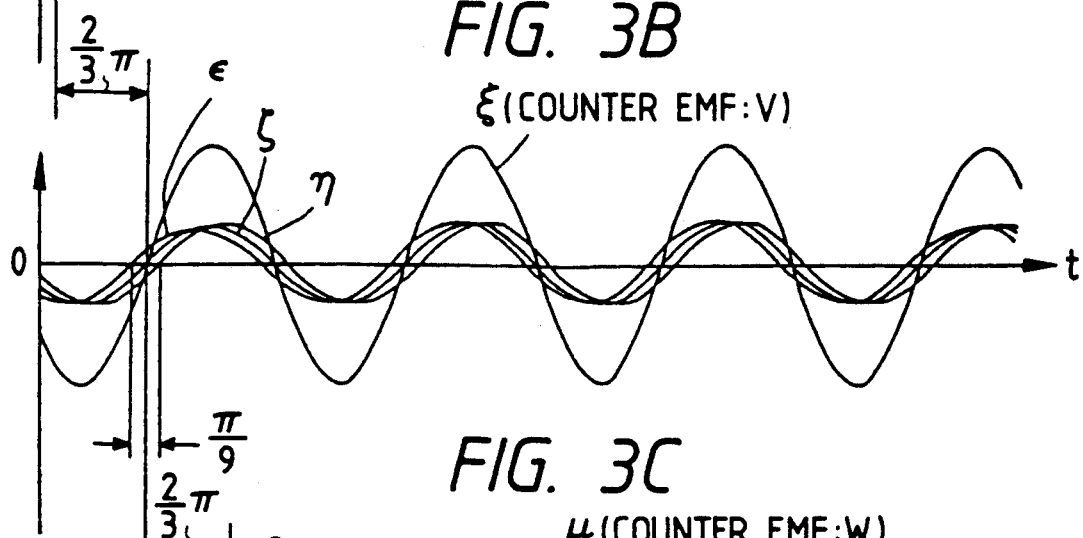
Figure 3C:
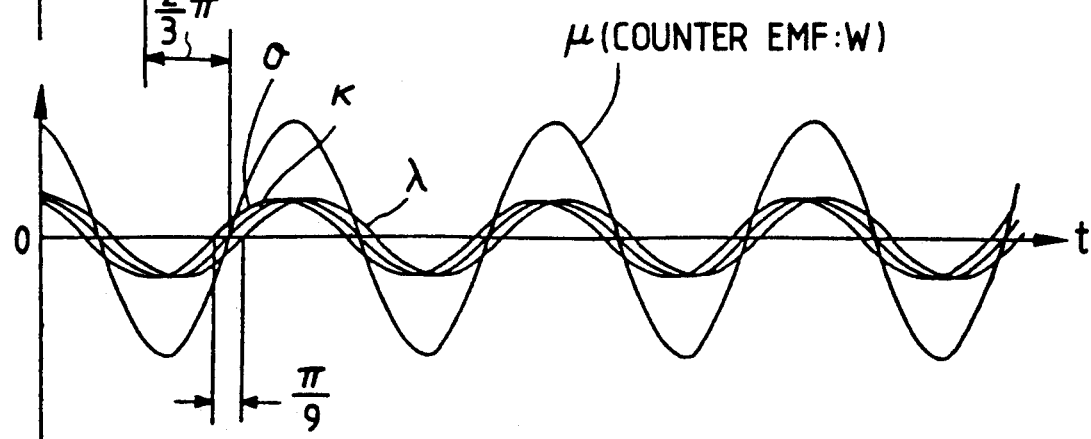

FIGS. 3A through 3C are diagrams showing the waveforms of counterelectromotive forces generated in the respective phases of the motor 1. More specifically, the curve $\alpha$ in FIG. 3A represents the waveform of a counter-electromotive force generated by the core $c_1$, the curve $\beta$ the waveform of a counterelectromotive force generated by the core $c_2$, and the curve Y the waveform of a counter-electromotive force generated by the core $c_5$. As indicated by the figure, each of these curves is successively phase shifted by $\pi/9$. The curve $\delta$ in FIG. 3A indicates the combined waveform of the counter-electromotive forces generated by these cores $c_1$, $c_3$, $c_5$, i.e., in the U phase. The curve $\epsilon$ in FIG. 3B represents the waveform of a counterelectromotive force generated by the core $c_4$, the curve $\xi$ the waveform of a counterelectromotive force generated by the core $c_6$, and the curve $\eta$ the waveform of a counterelectromotive force generated by the core $c_8$. The latter-mentioned curves in FIG. 3B are also successively phase shifted by $\pi/9$. The curve $\xi$ in FIG. 3B indicates the combined waveform of the counterelectromotive forces generated by these cores $c_4$, $c_6$, $c_8$, i.e., in the V phase. The curve $\theta$ in FIG. 3C represents the waveform of a counterelectromotive force generated by the core $c_7$, the curve k the waveform of a counterelectromotive force generated by the core $c_9$, and the curve $\lambda$ the waveform of a counterelectromotive force generated by the core $c_2$. The latter-mentioned curves in FIG. 3C are also successively phase shifted by $\pi/9$. The curve $\mu$ in FIG. 3C indicates the combined waveform of the counterelectromotive forces generated by these cores $c_7$, $c_9$, $c_2$, i.e., in the W phase. It will be observed that the combined waveforms of counter-electromotive force in FIGS. 3A-3C are successively phase shifted by $2\pi/3$.

The cogging torque produced by the three-phase direct-current motor 1 thus constructed was measured in comparison with a conventional motor having a similar number of magnetic poles and a similar number of slots. It was confirmed as a result of the comparison that the cogging torque of the motor 1 of the present invention was much lower than that of the conventional motor.

2nd Embodiment

FIG. 2 shows a three-phase direct-current motor 2 according to the second embodiment of the present invention, the motor 2 having 22 magnetic poles and 15 slots (n=2 in Table 3). The motor 2 shown in FIG. 2 differs from the motor 1 in that the motor 2 has more magnetic poles M and more cores (slots). Each of the three phases is provided by every other core, totaling five cores (e.g., $c_1$, $c_3$, $c_6$, $c_7$, $c_9$) around which a coil is wound in successively opposite directions. The 15 cores $c_1$ through $c_{15}$ are all out of phase with the magnetic poles M. Each of the three phases is provided by three cores which are positioned less out of phase with the magnetic poles M.

More specifically, as shown in FIG. 2, it is assumed that a coil $L_1$ is wound CW around the core $c_1$. The phase difference $\Psi_4$ between the cores $c_1$, $c_3$ with respect to the magnetic poles M is given, in terms of an electrical angle, from the equation 2 as follows:

$$\Psi_4 = (360°/15) \times 11 \times 2(nd) = 528° = 360° + 168°.$$

Thus, the phase difference $\Psi_4$ is 168°. If the coil $L_1$ is wound CCW around the core $c_3$, then the phase difference $\Psi_4'$ on the waveform of a counterelectromotive force is given as $\Psi_4' = 180° - 168° = 12°$. A U phase is thus formed by winding the coil $L_1$ around the cores: $c_1(CW) \rightarrow c_3(CCW) \rightarrow c_5(CW) \rightarrow c_7(CCW) \rightarrow c_9(CW)$. A V phase is formed by winding a coil $L_2$ as follows: $c_{11}(CW) \rightarrow c_{12}(CCW) \rightarrow c_{15}(CW) \rightarrow c_2(CCW) \rightarrow c_4(CW)$. Likewise, a W phase is formed by winding a coil $L_3$ as follows: $c_6(CW) \rightarrow c_8(CCW) \rightarrow c_{10}(CW) \rightarrow (CW) \rightarrow c_{12}(CCW) \rightarrow c_{14}(CW)$. Since the cores $c_1$ and $c_{11}$ and the cores $c_{11}$ and $c_6$ are positioned out of phase with each other by 120° in terms of an electrical angle, these U, V, and W phases provide the three phases of the direct-current motor 2.

Figure 4A:
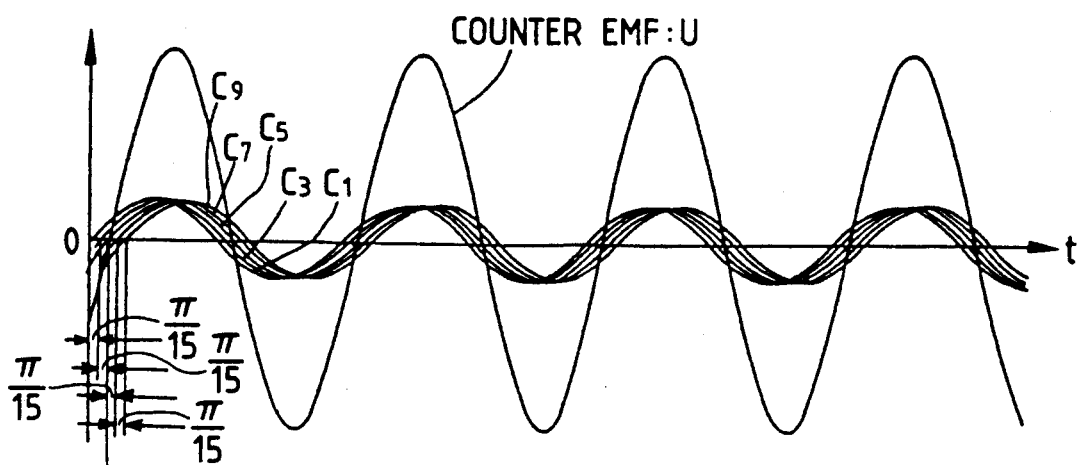
FIGS. 4A through 4C are diagrams showing the waveforms of counterelectromotive forces generated in the three-phase direct-current motor according to the second embodiment.
Figure 4B:
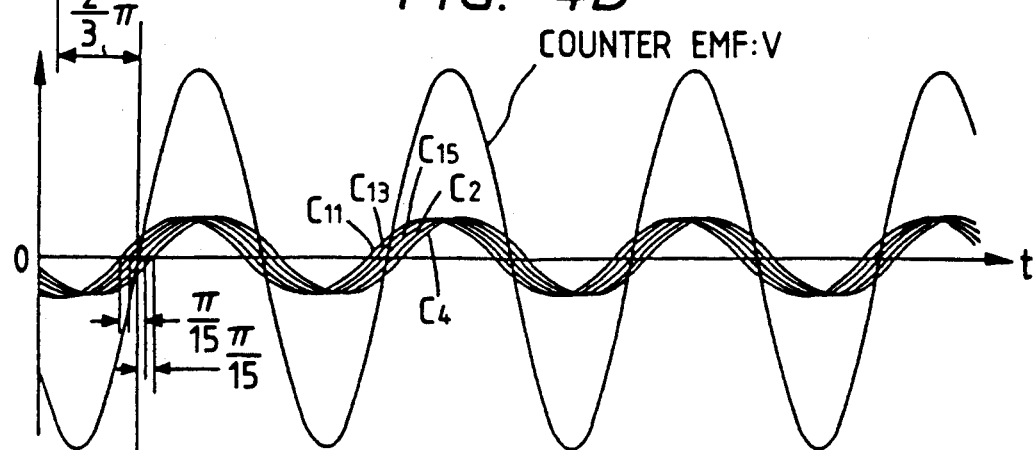
Figure 4C:
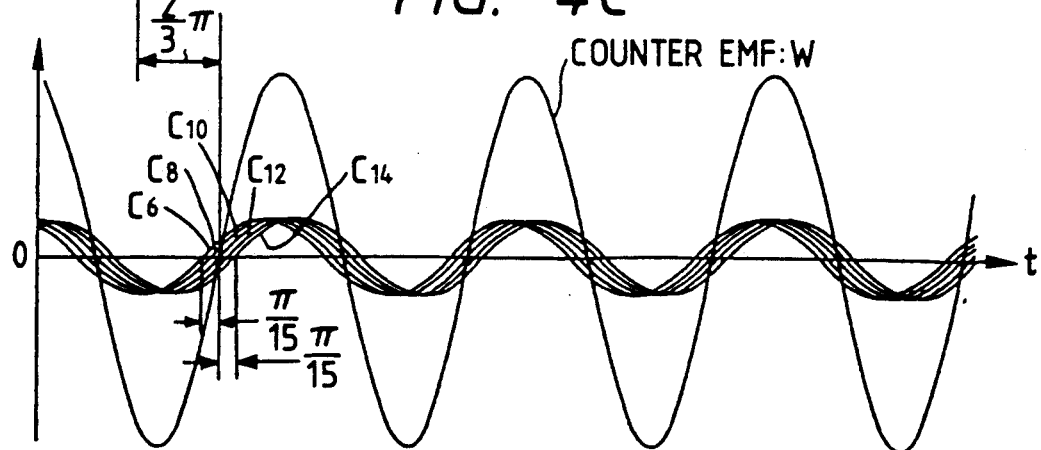

FIGS. 4A through 4C illustrate the waveforms of counterelectromotive forces generated in the respective phases of the motor 2. These waveforms are basically the same as those shown in FIGS. 3A through 3C except that there are five cores in each of the phases of the motor 2 and successive phase shifts are $\pi/15$ instead of $\pi/9$. The counterelectromotive force waveforms shown in FIGS. 4A through 4C are denoted by the corresponding reference characters $c_1$ through $c_{15}$ of the cores by which the counterelectromotive forces are generated, and will not be described in detail.

According to the third through sixth embodiments of the present invention, the number of magnetic poles P and the number of slots N of a three-phase direct-current motor are defined as follows:

$$P = 2(3n \pm 1), \quad N = 6n$$

where n is an integer of 2 or more.

Specific numerical values of the number of magnetic poles P, the number of slots N, the cogging frequency F, and the number of positions K where cogging takes place at the same time, of the three-phase direct-current motor according to each of the first and second embodiments of the present invention are given in Tables 4 and 5 below.

TABLE 4

| | [P = 2(3n + 1)] | | | |
|---|---|---|---|---|
| n | P | N | F | K |
| 2 | 14 | 12 | 84 | 2 |
| 3 | 20 | 18 | 180 | 2 |
| 4 | 26 | 24 | 312 | 2 |
| 5 | 32 | 30 | 480 | 2 |
| 6 | 38 | 36 | 684 | 2 |
| . | . | . | . | . |
| . | . | . | . | . |

TABLE 5

| | [P = 2(3n − 1)] | | | |
|---|---|---|---|---|
| n | P | N | F | K |
| 2 | 10 | 12 | 60 | 2 |
| 3 | 16 | 18 | 144 | 2 |
| 4 | 22 | 24 | 264 | 2 |
| 5 | 28 | 30 | 420 | 2 |
| 6 | 34 | 36 | 612 | 2 |
| . | . | . | . | . |
| . | . | . | . | . |

It can be seen from Tables 4 and 5 and the equation (1) above that cogging takes place simultaneously at only two positions. Such two positions are diametrically opposite to each other or symmetric with respect to the rotatable shaft of the motor. Therefore, even if the field magnet is disposed eccentrically with respect to the armature, resulting in different gaps therebetween, an increase in the magnitude of cogging across the reduced gap is canceled out by a reduction in the magnitude of cogging across the increased gap. Accordingly, the eccentric arrangement of the field magnet and the armature does not adversely affect the cogging of the motor.

According to the third through sixth embodiments, since the cores are all out of phase with the magnetic poles, it is necessary to wind a coil around n cores which are less out of phase with each other in successively opposite directions, and then wind the coil around other n cores which are positioned symmetrically and in phase with the former n cores, thus providing one phase that is composed of a total of 2n cores.

3rd Embodiment

Figure 5:
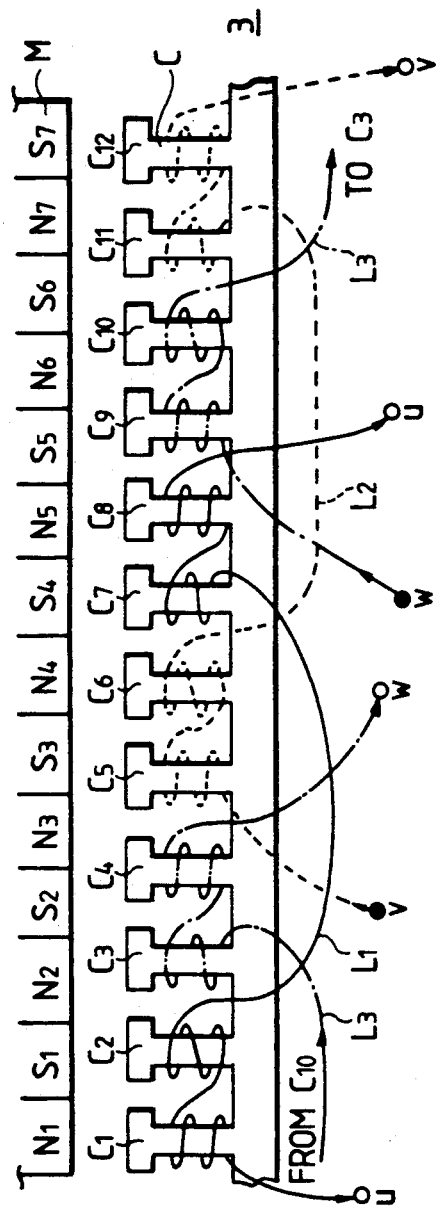
FIG. 5 is a schematic developed plan view of a three-phase direct-current motor according to a third embodiment of the present invention.

FIG. 5 shows a three-phase direct-current motor 3 according to the third embodiment of the present invention, the motor 3 having 14 magnetic poles and 12 slots (n=2 in Table 4). Those parts shown in FIG. 5 which are identical to those of the conventional motor shown in FIG. 16 are denoted by identical reference numerals, and will not be described in detail. It is assumed that a coil $L_1$ is wound CW around the core $c_1$. The phase difference $\Psi_2$ between the cores $c_1$, $c_2$ with respect to the magnetic poles M is given, in terms of an electrical angle, from the equation 2 as follows:

$$\Psi_2 = (360°/12) \times 7 = 210°$$

If the coil $L_1$ is wound CCW around the core $c_2$, then the phase difference $\Psi_2'$ on the waveform of a counter-electromotive force is given as $\Psi_2' = 210° - 180° = 30°$. Since the core $c_7$ is 180° out of phase with the core $c_1$, the coil $L_1$ is wound CCW around the core $c_7$, and since the core $c_8$ is 30° out of phase with the core $c_1$, the coil $L_1$ is wound CW around the core $c_8$. Therefore, a U phase is formed by winding the coil $L_1$ around these four cores as follows: $c_1(CW) \rightarrow c_2(CCW) \rightarrow c_7(CCW) \rightarrow c_8(CW)$.

The core $c_5$ is positioned out of phase with the core $c_1$ by $\Psi_2 = (360°/12) \times 7 \times 4(th) = 840° = 2 \times 360° + 120°$, i.e., by 120°. A V phase is thus formed by winding a coil $L_2$ CW around the core $c_5$, CCW around the core $c_6$, and CCW around the core $c_{11}$, and CW around the core $c_{12}$ $\{c_5(CW) \rightarrow c_6(CCW) \rightarrow c_{11}(CCW) \rightarrow c_{12}(CW)\}$. Likewise, a W phase is formed by winding a coil $L_3$ CW around the core $c_9$, which is 240° out of phase with the core $c_1$, CCW around the core $c_{10}$, CCW around the core $c_3$, and CW around $c_4$ $\{c_9(CW) \rightarrow c_{10}(CCW) \rightarrow c_3(CCW) \rightarrow c_4(CW)\}$. In this manner, the three phases U, V, W of the three-phase direct-current motor 3 are constructed.

By supplying three-phase electric currents which are 120° out of phase to the U, V, and W phases of the motor 3, a continuous torque is generated between the field magnet and the armature.

Figure 9A:
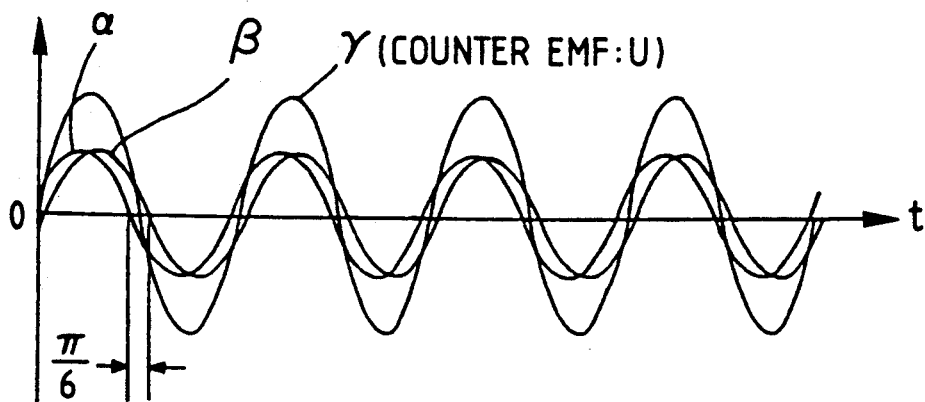
FIGS. 9A through 9C are diagrams showing the waveforms of counterelectromotive forces generated in the three-phase direct-current motor according to each of the third and fourth embodiments.
Figure 9B:
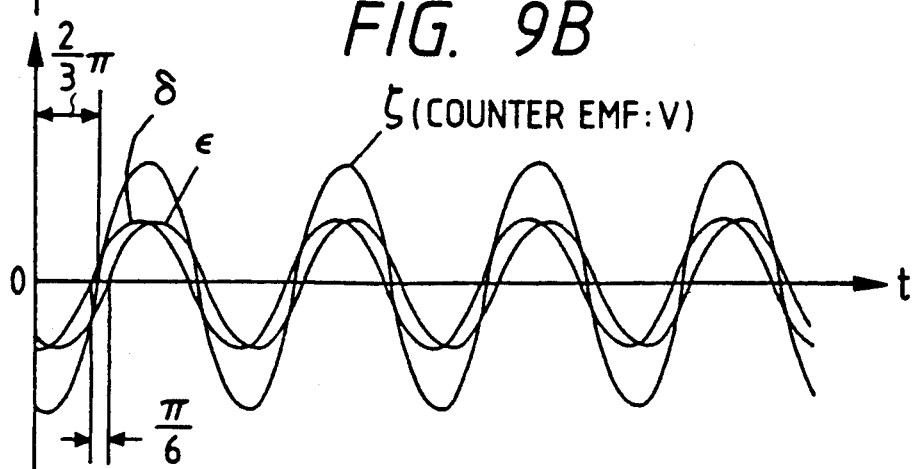
Figure 9C:
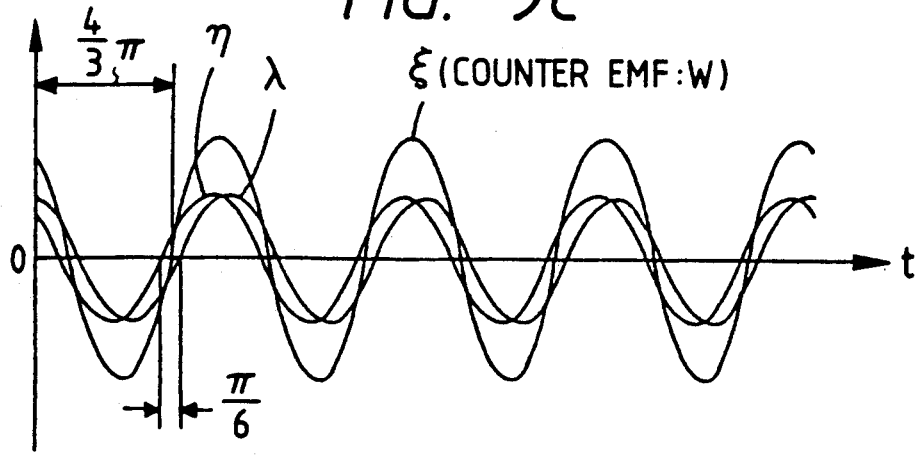

FIGS. 9A through 9C are diagrams showing the waveforms of counterelectromotive forces generated in the respective phases of the motor 3. More specifically, the curve $\alpha$ in FIG. 9A represents the waveform of counter-electromotive forces generated by the cores $c_1$ and $c_7$, the curve $\beta$ the waveform of counterelectromotive forces generated by the cores $c_3$ and $c_8$, and the curve $\gamma$ the combined waveform of counterelectromotive forces generated by the cores $c_1$, $c_7$, $c_2$, $c_8$, i.e., in the U phase. The curve $\delta$ in FIG. 9B represents the waveform of counterelectromotive forces generated by the cores $c_2$ and $c_9$, the curve $\epsilon$ the waveform of counterelectromotive forces generated by the cores $c_4$ and $c_{10}$, and the curve $\zeta$ the combined waveform of counterelectromotive forces generated by the cores $c_3$, $c_9$, $c_4$, $c_{10}$, i.e. in the V phase. The curve $\eta$ in FIG. 9C represents the waveform of counterelectromotive forces generated by the cores $c_5$ and $c_{11}$, the curve $\lambda$ the waveform of counterelectromotive forces generated by the cores $c_6$ and $c_{12}$, and the curve $\xi$ the combined waveform of counterelectromotive forces generated by the cores $c_2$, $c_{11}$, $c_6$, $c_{12}$, i.e., in the W phase. Since the counterelectromotive forces generated in the U, V, and W phases are 120° ($2\pi/3$) out of phase with each other, the motor 3 can be continuously rotated by the three-phase currents supplied thereto. As shown in each FIGS. 9A-9C, the individual waveforms of counter-electromotive forces are phase shifted by $\pi/6$.

Figure 15:
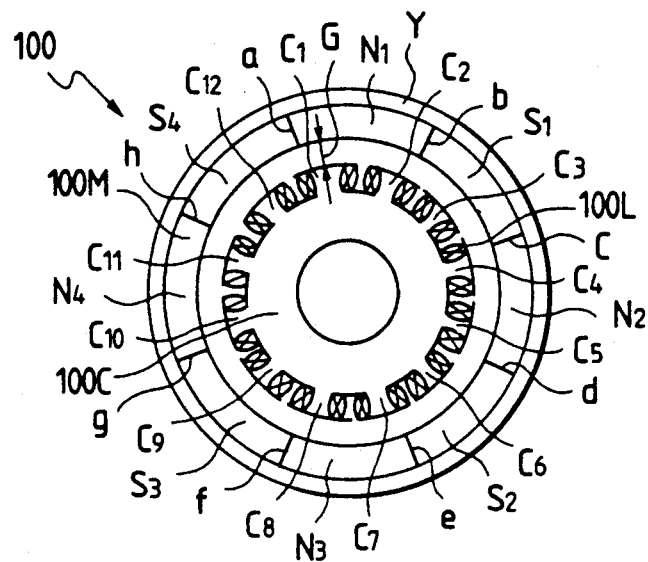
FIG. 15 is a cross-sectional view of a conventional three-phase direct-current motor.

The cogging torque produced by the three-phase direct-current motor 3 thus constructed was measured in comparison with a conventional motor having 16 magnetic poles (twice the magnetic poles of the conventional motor shown in FIG. 15) and 12 slots. The cogging torque and torque constant of the conventional motor were 5.7 [gcm] and 0.112 [gcm/mA], respectively, whereas the those of the motor 3 of the present invention were 0.26 [gcm] and 0.117 [gcm/mA], respectively. It was therefore confirmed that the torque was increased about 4% and the cogging torque of the motor 3 of the present invention was much lower than (1/20 or less of) that of the conventional motor.

4th Embodiment

Figure 6:
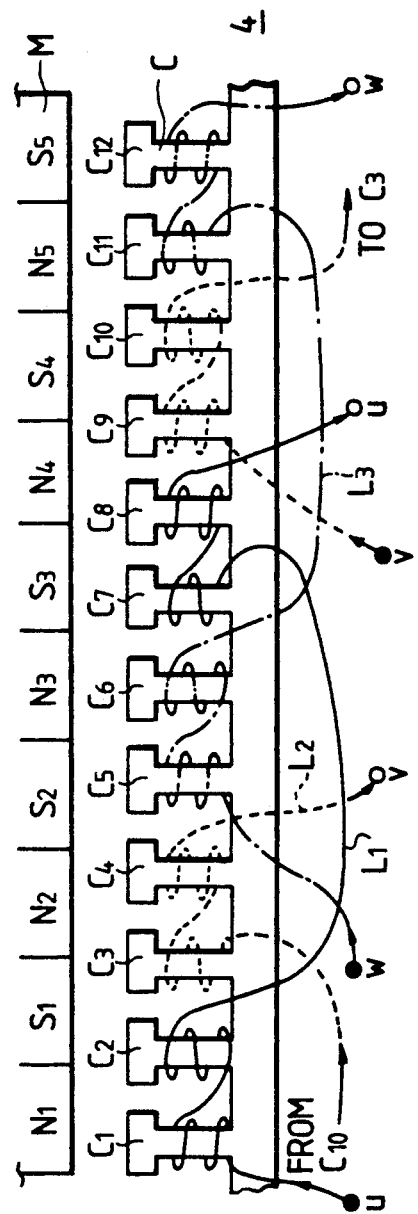
FIG. 6 is a schematic developed plan view of a three-phase direct-current motor according to a fourth embodiment of the present invention.

FIG. 6 shows a three-phase direct-current motor 4 according to the fourth embodiment of the present invention, the motor 4 having 10 magnetic poles and 12 slots (n=2 in Table 5). Those parts shown in FIG. 6 which are identical to those of the motor shown in FIG. 5 are denoted by identical reference numerals, and will not be described in detail. The motor 4 shown in FIG. 6 differs from the motor 3 in that the motor 4 has fewer magnetic poles M. The waveforms of counterelectromotive forces generated in the U, V, and W phases of the motor 4 are the same as those shown in FIGS. 9A through 9C.

5th Embodiment

Figure 7:
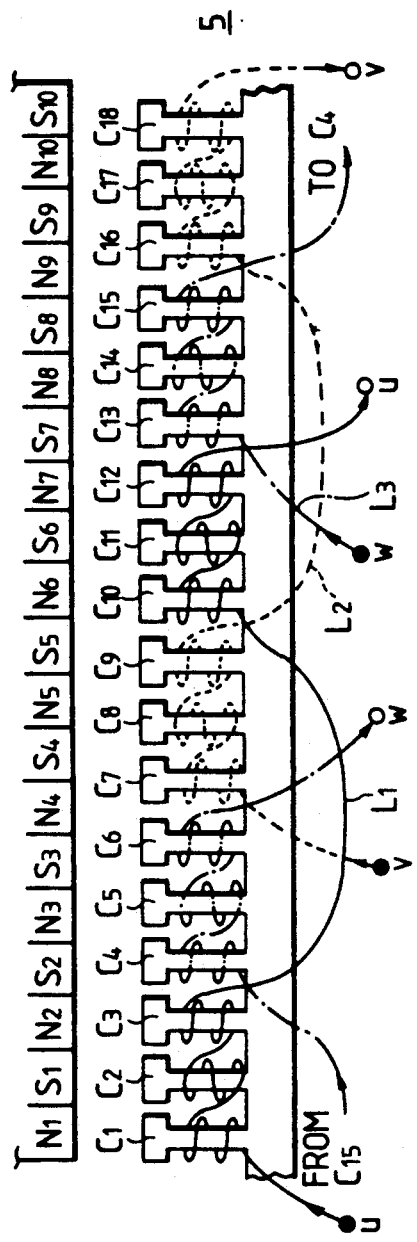
FIG. 7 is a schematic developed plan view of a three-phase direct-current motor according to a fifth embodiment of the present invention.

FIG. 7 shows a three-phase direct-current motor 5 according to the fifth embodiment of the present invention, the motor 5 having 20 magnetic poles and 18 slots (n=n in Table 4). The motor 5 shown in FIG. 7 differs from the motor 4 in that the motor 5 has more magnetic poles M and more cores (slots). More specifically, the number of magnetic poles M of the motor 5 is twice the number of magnetic poles M of the motor 4, and the number of cores of the motor 5 is 3/2 the number of cores of the motor 4. A coil is wound around three adjacent cores (e.g., $c_1$ through $c_3$) in successively opposite directions, and then around three adjacent cores (e.g., $c_{10}$ through $c_{12}$), which are positioned symmetrically and in phase with the former three cores, in successively opposite directions, thus providing one phase composed of a total of six cores.

It is assumed that a coil $L_1$ is wound CW around the core $c_1$. The phase difference $\Psi_4$ between the cores $c_1$, $c_2$ with respect to the magnetic poles M is given, in terms of an electrical angle, from the equation 2 as follows:

$$\Psi_4 = (360°/18) \times 10 = 200°$$

If the coil $L_1$ is wound CCW around the core $c_2$, then the phase difference $\Psi_4'$ on the waveform of a counter-electromotive force is given as $\Psi_4' = 200° - 180° = 20°$. If the coil $L_1$ is wound CW around the core $c_3$, then the phase difference between the cores $c_2$, $c_3$ is 20°. In this manner, the coil $L_1$ is wound around the three adjacent cores which are 20° out of phase. Then, the coil $L_1$ is wound CW around the core $c_{10}$, which is positioned symmetrically and in phase with the core $c_1$, CCW around the core $c_{11}$, and CW around the core $c_{12}$. Therefore, a U phase is formed by winding the coil $L_1$ in these six cores: $c_1(CW) \rightarrow c_2(CCW) \rightarrow c_3(CW) \rightarrow c_{10}(CW) \rightarrow c_{11}(CCW) \rightarrow c_{12}(CW)$.

The core $c_7$ is positioned out of phase with the core $c_1$ by $\Psi_5 = (360°/18) \times 10 \times 6(th) = 120°$. Thus a V phase is formed by winding the coil $L_2$ in six cores: $c_7(CW) \rightarrow c_8(CCW) \rightarrow c_9(CW) \rightarrow c_{16}(CW) \rightarrow c_{17}(CCW) \rightarrow c_{18}(CW)$. A W phase is formed by winding the coil $L_3$ first CW around the core $c_4$, which is 240° out of phase with the core $c_1$, and then around other five cores as follows:
$c_1(CW) \rightarrow c_5(CCW) \rightarrow c_6(CW) \rightarrow c_{13}(CW) \rightarrow c_{14}(CCW) \rightarrow c_{15}(CW)$. These U, V, and W phases constitute the direct-current motor 5.

Figure 10A:
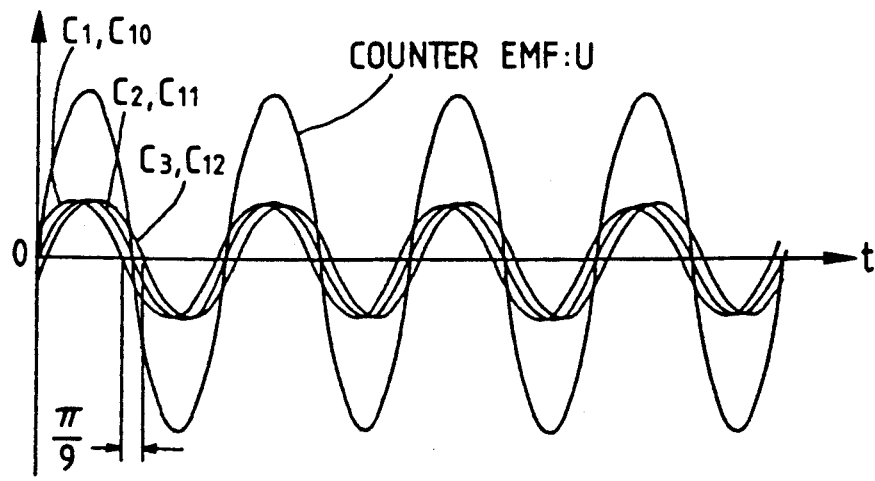
FIGS. 10A through 10C are diagrams showing the waveforms of counter-electromotive forces generated in the three-phase direct-current motor according to each of the fifth and sixth embodiments.
Figure 10B:
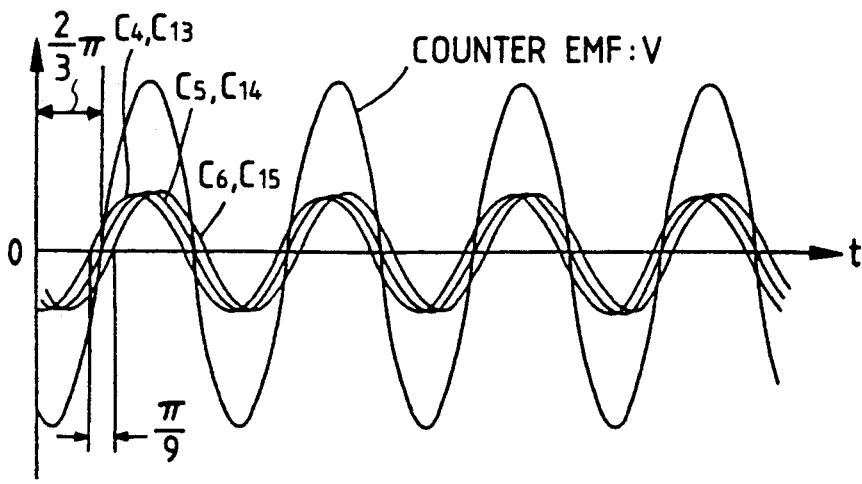
Figure 10C:
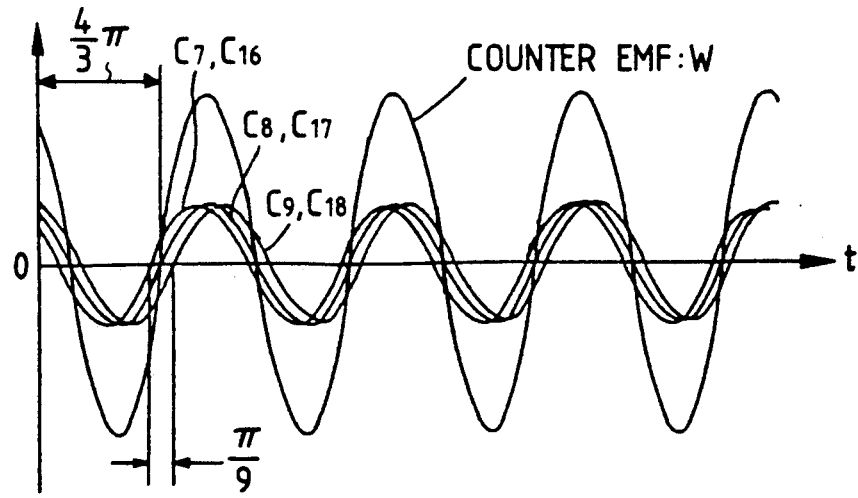

FIGS. 10A through 10C illustrate the waveforms of counterelectromotive forces generated in the respective phases of the motor 5. These waveforms are basically the same as those shown in FIGS. 9A through 9C except that there are six cores in each of the phases of the motor 5. The counterelectromotive force waveforms shown in FIGS. 10A through 10C are denoted by the corresponding reference characters $c_1$ through $c_{18}$ of the cores by which the counterelectromotive forces are generated, and will not be described in detail. However, it will be observed that, in each of the figures, the individual waveforms of counter-electromotive forces are successively phase shifted by $\pi/9$ while the combined waveform in each of the figures shows a relative phase shift of $2\pi/3$. Specifically, the combined counterelectromotive force of FIG. 10B is phase shifted $2\pi/13$ relative to that of FIG. 10A while the combined counterelectromotive force of FIG. 10C is phase shifted by $4\pi/3$ relative to that of FIG. 10A. The same relationships pertain in FIGS. 9A–9C.

6th Embodiment

Figure 8:
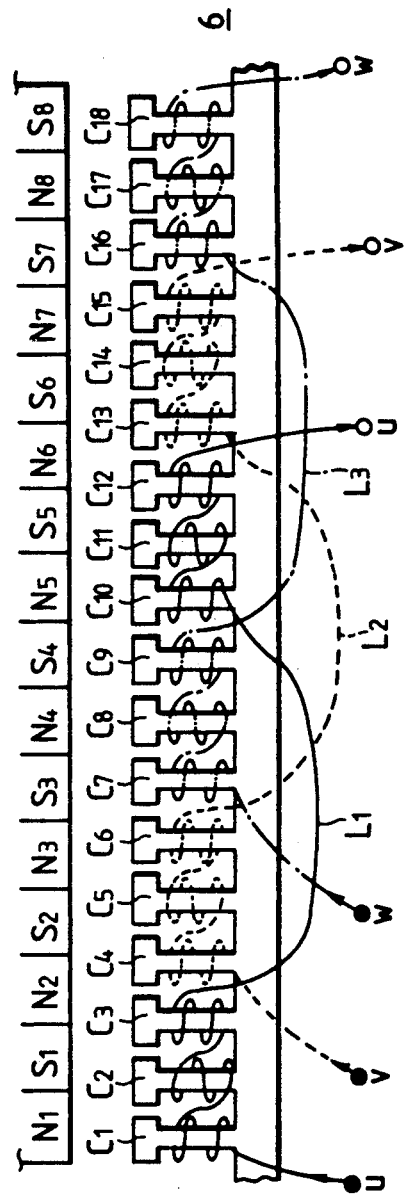
FIG. 8 is a schematic developed plan view of a three-phase direct-current motor according to a sixth embodiment of the present invention.

FIG. 8 shows a three-phase direct-current motor 6 according to the sixth embodiment of the present invention, the motor 6 having 16 magnetic poles and 18 slots (n=3 in Table 5). The motor 6 shown in FIG. 8 differs from the motor 5 in that the motor 6 has fewer magnetic poles M. The waveforms of counterelectromotive forces generated in the U, V, and W phases of the motor 6 are the same as those shown in FIGS. 10A through 10C.

According to seventh through ninth embodiments of the present invention, the number of magnetic poles P and the number of slots (cores or protruding poles) N of a polyphase direct-current motor are defined as follows:

$$P = 2(n\Phi \pm 1), \quad N = 2n\Phi$$

where n is an integer of 2 or more, and $\Phi$ is the number of phases. A coil is wound around n adjacent cores in successively opposite directions, and then wound around other n cores, which are positioned symmetrically and in phase with the former n cores, thus providing one phase that is composed of a total of 2n cores.

Moreover, if the number of phases is indicated by $\Phi'$ (which is an even number of 4 or more), then the number of magnetic poles P and the number of slots N are determined from the above equations provided $\Phi = \Phi'/2$. Therefore, the above equation may be rewritten as $P = 2\{n(1\ \underline{1}) \pm 1\}$ and $N = n1$. In this case, a coil of one phase is wound around n adjacent cores in successively opposite directions.

7th Embodiment

According to the seventh embodiment of the present invention, a two-phase direct-current motor 7 is arranged such that the number of magnetic poles P and the number of slots N are given by: $P = 2(2n \pm 1)$, $N = 4n$ (where n is an integer of 2 or more). Specific numerical values of the number of magnetic poles P, the number of slots N, the cogging frequency F, and the number of positions K where cogging takes place at the same time, of the three-phase direct-current motor 7 according to the seventh embodiment of the present invention are given in Tables 6 and 7 below.

TABLE 6

[$P = 2(2n + 1)$]

| n | P | N | F | K |
|---|----|----|-----|---|
| 2 | 10 | 8  | 40  | 2 |
| 3 | 14 | 12 | 84  | 2 |
| 4 | 18 | 16 | 144 | 2 |
| 5 | 22 | 20 | 220 | 2 |
| 6 | 26 | 24 | 312 | 2 |
| . | .  | .  | .   |   |
| . | .  | .  | .   |   |
| . | .  | .  | .   |   |

TABLE 7

[$P = 2(2n - 1)$]

| n | P | N | F | K |
|---|----|----|-----|---|
| 2 | 6  | 8  | 24  | 2 |
| 3 | 10 | 12 | 60  | 2 |
| 4 | 14 | 16 | 112 | 2 |
| 5 | 18 | 20 | 180 | 2 |
| 6 | 22 | 24 | 264 | 2 |
| . | .  | .  | .   |   |
| . | .  | .  | .   |   |
| . | .  | .  | .   |   |

It can be seen from Tables 6 and 7 that cogging takes place simultaneously at only two positions irrespective of the number of magnetic poles P and the number of slots N. Such two positions are diametrically opposite to each other or symmetric with respect to the rotatable shaft of the motor. A two-phase direct-current motor 7 (FIG. 11) according to the seventh embodiment has 14 magnetic poles and 12 slots (n=3 in Table 6). The cores $c_1$ through $c_{12}$ are positioned out of phase with the magnetic poles M. A coil of one phase is wound around three adjacent cores which are less out of phase with each other in successively opposite directions, and then wound around the other three adjacent cores which are positioned symmetrically with respect to the rotatable shaft of the motor 7, in successively opposite directions. Thus, the coil of one phase is wound in series around a total of six cores.

Figure 11:
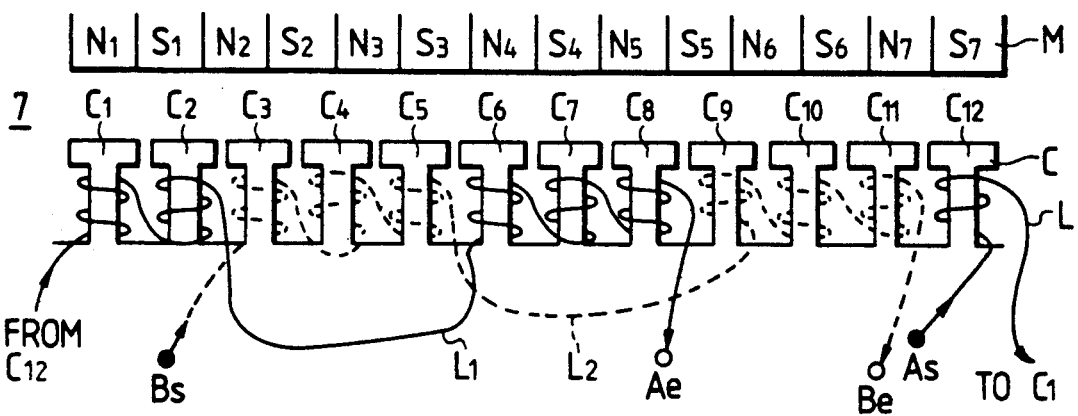
FIG. 11 is a schematic developed plan view of a three-phase direct-current motor according to a seventh embodiment of the present invention.

More specifically, as shown in FIG. 11, it is assumed that a coil $L_1$ is wound CCW wound around the core $c_{12}$. The phase difference $\phi_1$ between the cores $c_{12}$, $c_1$ with respect to the magnetic poles M is given, in terms of an electrical angle, from the equation 2 as follows:

$$\phi_1 = (360°/12) \times 7 = 210°$$

If the coil $L_1$ is wound CW around the core $c_1$, then the phase difference $\phi_1 40$ on the waveform of a counterelectromotive force is given as $\phi_1' = 210° - 180° = 30°$. Since the core $c_2$ is 210° out of phase with the core $c_1$, if the coil $L_1$ is wound CCW around the core $c_2$, then the phase difference on the counterelectromotive force waveform is 30°. Since the core $c_6$ is 180° out of phase with the core $c_{12}$, the coil $L_1$ is wound CW around the core $c_6$, and since the core $c_7$ is 180° out of phase with the core $c_1$, the coil $L_1$ is wound CCW around the core $c_7$. Since the core $c_8$ is 180° out of phase with the core $c_2$, the coil $L_1$ is wound CW around the core $c_8$. Therefore, the coil $L_1$ is wound successively around these six cores in the following manner: $c_{12}(CCW)\cdot c_1(CW) \rightarrow c_2(CCW) \rightarrow c_6(CW) \rightarrow c_7(CCW) \rightarrow c_8(CW)$, thus providing an A phase (first phase).

The core $c_3$ is positioned out of phase with the core $c_{12}$ by a phase difference $\phi_2$, which is indicated by an electrical angle as follows:

$\phi_2 32 (360°/12) \times 7 \times 3(\text{rd}) = 630° = 360° + 270°$ Therefore, the core $c_3$ is 270° ($= 180° + 90°$) out of phase with the core $c_{12}$. By winding a coil $L_2$ CW around the core $c_3$, the cores $c_3$, $c_{12}$ are 90° out of phase with each other. A B phase (second phase) can be formed by winding the coil $L_2$ around six cores as follows: $c_3(\text{CW}) \rightarrow c_4(\text{CCW}) \rightarrow c_5(\text{CW}) \rightarrow c_9(\text{CCW}) \rightarrow c_{10}(\text{CW}) \rightarrow c_{11}(\text{CCW})$.

When electric currents which are 90° out of phase with each other are supplied to the coils in the A and B phases successively in both directions, i.e., in a forward direction for the A phase, a forward direction for the B phase, a reverse direction for the A phase, and a reverse direction for the B phase, a torque is continuously produced between the field magnet and the armature.

Since two cores are 180° out of phase with respect to the magnetic poles M, the magnitude of the total cogging produced at any one time by the motor 7 is about twice the magnitude of cogging generated at one slot.

FIGS. 14A and 14B illustrate the waveforms of counterelectromotive forces generated in the respective phases of the motor 7. The curve $a_1$ in FIG. 14A represents the waveform of counterelectromotive forces generated by the cores $c_{12}$ and $c_6$, the curve $a_2$ the waveform of counterelectromotive forces generated by the cores $c_1$ and $c_7$, and the curve $a_3$ the waveform of counterelectromotive forces generated by the cores $c_2$ and $c_8$. The curve a indicates the combined waveform of these waveforms indicated by the curves $a_1$, $a_2$, $a_3$, i.e., in the A phase, these waveforms showing succeeding phase shifts of $\pi/6$. The curve $b_1$ in FIG. 14B represents the waveform of counterelectromotive forces generated by the cores $c_3$ and $c_9$, the curve $b_2$ the waveform of counterelectromotive forces generated by the cores $c_4$ and $c_{10}$, and the curve $b_3$ the waveform of counterelectromotive forces generated by the cores $c_5$ and $c_{11}$. The curve b indicates the combined waveform of these waveforms indicated by the curves $b_1$, $b_2$, $b_3$, i.e., in the B phase, these waveforms showing succeeding phase shifts of $\pi/6$. As shown in FIGS. 14A and 14B, the counterelectromotive forces generated in the A and B phases are 90° ($\pi/2$) out of phase with each other, so that the motor 7 can be continuously rotated by the currents supplied thereto.

8th Embodiment

According to the eighth embodiment of the present invention, a four-phase direct-current motor may be arranged such that the number of magnetic poles P and the number of slots N are given by: $P = 2(4n \pm 1)$, $N = 8n$ (where n is an integer of 2 or more), and may be continuously rotated by four-phase electric currents supplied thereto successively in both directions. In the following embodiment, however, ½ of the number of phases: 4 is employed (i.e., $\Phi = 2$) to determine a combination of P and N, and four-phase coils are wound around the cores, and the motor is continuously rotated by four-phase electric current supplied thereto in one direction. Tables 6 and 7 are also applicable to the motor of the eighth embodiment of the present invention for the combinations of P and N.

A four-phase direct-current motor 8 (FIG. 12) according to the eighth embodiment has 14 magnetic poles and 12 slots (n=3 in Table 6). The cores $c_1$ through $c_{12}$ are positioned out of phase with the magnetic poles M. A coil of one phase is wound around three adjacent cores which are less out of phase with each other in successively opposite directions, thus forming one phase.

Figure 12:
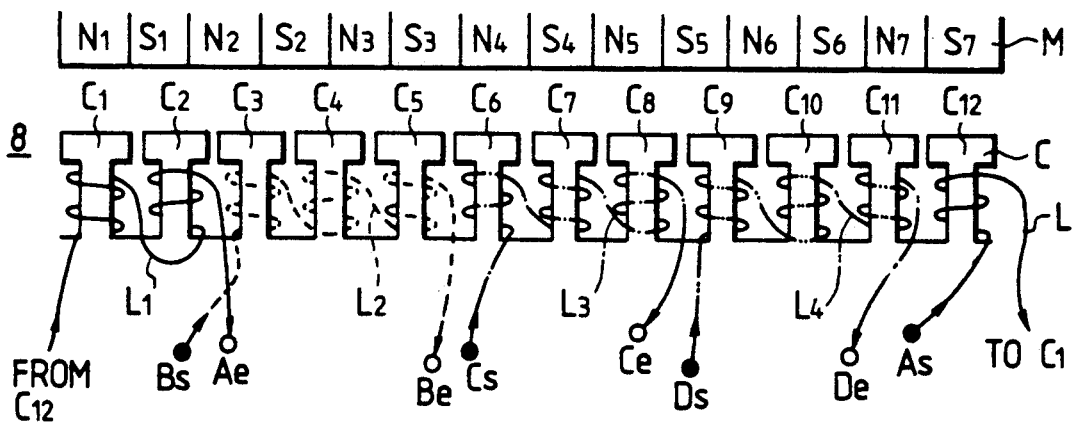
FIG. 12 is a schematic developed plan view of a three-phase direct-current motor according to an eighth embodiment of the present invention.

More specifically, as shown in FIG. 12, it is assumed that a coil $L_1$ is wound CCW wound around the core $c_{12}$. The coil $L_1$ is then wound CW around the core $c_1$, and CCW around the core $c_2$. Therefore, an A phase (first phase) is formed by winding the coil $L_1$ around three adjacent cores as follows: $c_{12}(\text{CCW}) \rightarrow c_1(\text{CW}) \rightarrow c_2(\text{CCW})$.

The core $c_3$ is positioned out of phase with the core $c_{12}$ by a phase difference of 270° (180° + 90°) in terms of an electrical angle. By winding a coil $L_2$ CW around the core $c_3$, the cores $c_3$, $c_{12}$ are 90° out of phase with each other. A B phase (second phase) can be formed by winding the coil $L_2$ around three adjacent cores as follows: $c_3(\text{CW}) \rightarrow c_4(\text{CCW}) \rightarrow c_5(\text{CW})$.

Likewise, a coil $L_3$ is wound CCW wound around three adjacent cores in the following manner: $c_6(\text{CCW}) \rightarrow c_7(\text{CW}) \rightarrow c_8(\text{CCW})$, thus forming a C phase (third phase). A D phase (fourth phase) is formed by winding a coil $L_4$ around three adjacent cores as follows: $c_9(\text{CW}) \rightarrow c_{10}(\text{CCW}) \rightarrow c_{11}(\text{CW})$.

When four-phase electric currents which are 90° out of phase with each other are supplied to the coils in the A, B, C, and D phases in one direction, a torque is continuously produced between the field magnet and the armature.

Since two cores are 180° out of phase with respect to the magnetic poles M, the magnitude of the total cogging produced at any one time by the motor 7 is about twice the magnitude of cogging generated at one slot.

9th Embodiment

According to the ninth embodiment of the present invention, a five-phase direct-current motor is arranged such that the number of magnetic poles P and the number of slots N are given by: $P = 2(5n \pm 1)$, $N = 10n$ (where n is an integer of 2 or more). Specific numerical values of the number of magnetic poles P, the number of slots N, the cogging frequency F, and the number of positions K where cogging takes place at the same time, of the three-phase direct-current motor according to the ninth embodiment of the present invention are given in Tables 8 and 9 below.

TABLE 8

| | [P = 2(5n + 1)] | | | |
|---|---|---|---|---|
| n | P | N | F | K |
| 2 | 22 | 20 | 220 | 2 |
| 3 | 32 | 30 | 480 | 2 |
| 4 | 42 | 40 | 840 | 2 |
| . | . | . | . | . |
| . | . | . | . | . |
| . | . | . | . | . |

TABLE 9

| | [P = 2(5n − 1)] | | | |
|---|---|---|---|---|
| n | P | N | F | K |
| 2 | 18 | 20 | 180 | 2 |
| 3 | 28 | 30 | 420 | 2 |
| 4 | 38 | 40 | 760 | 2 |
| . | . | . | . | . |
| . | . | . | . | . |
| . | . | . | . | . |

It can be seen from Tables 8 and 9 that cogging takes place simultaneously at only two positions irrespectively of the number of magnetic poles P and the number of slots N. Such two positions are diametrically opposite to each other or symmetric with respect to the rotatable shaft of the motor.

A five-phase direct-current motor 9 (FIG. 13) according to the ninth embodiment has 18 magnetic poles and 20 slots (n=2 in Table 9). The cores $c_1$ through $c_{20}$ are positioned out of phase with the magnetic poles M. A coil of one phase is wound around two adjacent cores which are less out of phase with each other in successively opposite directions, and then wound around the other two adjacent cores, which are positioned symmetrically with respect to the rotatable shaft of the motor and in phase with the former two cores, in successively opposite directions. Thus, the coil of one phase is wound in series around a total of four cores.

More specifically, as shown in FIG. 13, it is assumed that a coil $L_1$ is wound CW wound around the core $c_1$. The phase difference $\phi_5$ between the cores $c_1$, $c_2$ with respect to the magnetic poles M is given, in terms of an electrical angle, from the equation (2) as follows:

$$\phi_1 = (360°/20) \times 9 = 162°$$

If the coil $L_1$ is wound CCW around the core $c_2$, then the phase difference $\phi_5'$ on the waveform of a counter-electromotive force is given as $\phi_5' = 180° - 162° = 18°$. Since the core $c_{11}$ is 180° out of phase with the core $c_1$, the coil $L_1$ is wound CCW around the core $c_{11}$. Since the core $c_{12}$ is 180° out of phase with the core $c_2$, the coil $L_1$ is wound CW around the core $c_{12}$. Therefore, the coil $L_1$ is wound successively around these four cores in the following manner: $c_1(CW) \rightarrow c_2(CCW) \rightarrow c_{11}(CCW) \rightarrow c_{12}(CW)$, thus providing an A phase (first phase).

The core $c_7$ is positioned out of phase with the core $c_1$ by a phase difference $\phi_6$ which is indicated by an electrical angle as follows:

$$\phi_6 = (360°/20) \times 9 \times 6(th) = 972° = 2 \times 360° + 252°$$

Therefore, the core $c_7$ is 252° ($= 180° + 72°$) out of phase with the core $c_1$. A B phase (second phase) can be formed by winding the coil $L_2$ around four cores as follows: $c_7(CCW) \rightarrow c_8(CW) \rightarrow c_{17}(CW) \rightarrow c_{18}(CCW)$.

Likewise, a C phase (third phase) is formed by winding a coil $L_2$ around four cores as follows: $c_3(CCW) \rightarrow c_4(CW) \rightarrow c_{13}(CW) \rightarrow c_{14}(CCW)$. A D phase (fourth phase) is formed by winding a coil $L_4$ around four cores as follows: $c_9(CW) \rightarrow c_{10}(CCW) \rightarrow c_{19}(CCW) \rightarrow c_{20}(CW)$. An E phase (fifth phase) is formed by winding a coil $L_5$ around four cores as follows: $c_5(CW) \rightarrow c_6(CCW) \rightarrow c_{15}(CCW) \rightarrow c_{16}(CW)$.

When five-phase electric currents which are 72° out of phase with each other are supplied to the coils in the A through E phases, a torque is continuously produced between the field magnet and the armature.

Since two cores are 180° out of phase with respect to the magnetic poles M, the magnitude of the total cogging produced at any one time by the motor 9 is about twice the magnitude of cogging generated at one slot. In the direct-current motors according to the present invention, cogging is produced simultaneously at two positions at any one time. Since the number of such positions is much smaller than the number of corresponding positions in the conventional motors, the magnitude of the total cogging produced by the direct-current motors of the invention at any one time is small. The magnitude of the total cogging is not increased even if the number of magnetic poles P and the number of slots N increases. Therefore, the motors of the present invention can be designed with a higher degree of freedom, i.e., the numbers P and N can be increased in order to reduce torque ripples without concern over cogging.

The magnitude of cogging is smaller as the frequency of cogging per revolution of the motor is lower. With reduced cogging, jitter and wow and flutter can be reduced while the rotational speed of the motor is controlled by a servo control system. Therefore, the motors of the present invention where the cogging frequency is high are more advantageous than the conventional motors.

With the present invention, the cogging torque of a polyphase direct-current motor can be reduced without reducing the torque produced by the motor, and hence vibration and jitter of the motor can also be lowered. The direct-current motors of the present invention can advantageously be employed in a VTR, an HDD, an FDD, or any of various devices which require highly accurate rotation.

Although certain preferred embodiments have been shown and described, it should be understood that many changes and modifications may be made therein without departing from the scope of the appended claims.

What is claimed is:

1. A three-phase direct-current motor comprising:
   a field magnet having P field poles positioned as a circular array at angularly equally spaced intervals;
   an armature having cores as angularly equally spaced N protruding poles providing N slots therebetween the three-phase coils disposed therein;
   either said field magnet or said armature being rotatable with respect to the other; and
   P and N being defined by $P = 2(4n+3)$ and $N = 3(2n+1)$ wherein n is an integer of 1 or more, and being selected such that the least common multiple of N and P is equal to N x P.

2. A three-phase direct-current motor according to claim 1, wherein the coils disposed in said N slots are wound around every other core, totaling N/3 cores, in successively opposite directions, thus providing each of three phases.

3. A three-phase direct-current motor comprising:
   a field magnet having P field poles positioned as a circular array at angularly equally spaced intervals;
   an armature having cores as angularly equally spaced N protruding poles providing N slots therebetween with three-phase coils disposed therein;
   either said field magnet or said armature being rotatable with respect to the other; and
   P and N being defined by $P = 2(3n \pm 3)$ and $N = 6n$ wherein n is an integer of 2 or more.

4. A polyphase direct-current motor comprising:
   a field magnet having angularly equally spaced P field poles which comprise alternate north and south poles;
   an armature having cores as angularly equally spaced N protruding poles providing N slots therebetween the $\phi$ phase coils disposed therein;
   either said field magnet or said armature being rotatable with respect to the other;
   P and N being defined by $P = 2(n\phi \pm 1)$ and $N = 2n\phi$ where n is an integer of 2 or more;

each of said coils being wound around a first set of n adjacent cores in successively opposite directions, and then would around a second set of n cores, which are positioned symmetrically and in phase with the first set of n cores, thus providing one phase that is composed of a total of 2n cores.

5. A polyphase direct-current motor comprising:

a field magnet having angularly equally spaced P field poles which comprise alternate north and south poles;

an armature having cores as angularly equally spaced N protruding poles providing N slots therebetween the $\phi'$ phase coils disposed therein ($\phi'$ is an even number of 4 or more);

either said field magnet or said armature being rotatable with respect to the other;

P and N being defined by $P=2\{n\phi'/2\}\pm 156$ and $N=n\phi'$ $2n\phi'$ where n is an integer of 2 or more;

each of said coils being wound around n adjacent cores in successively opposite directions, thus providing one phase.

* * * * *